S. GRAHAM.
CAMERA SHUTTER EXPOSURE LOCK.
APPLICATION FILED OCT. 21, 1919.
1,355,328. Patented Oct. 12, 1920.
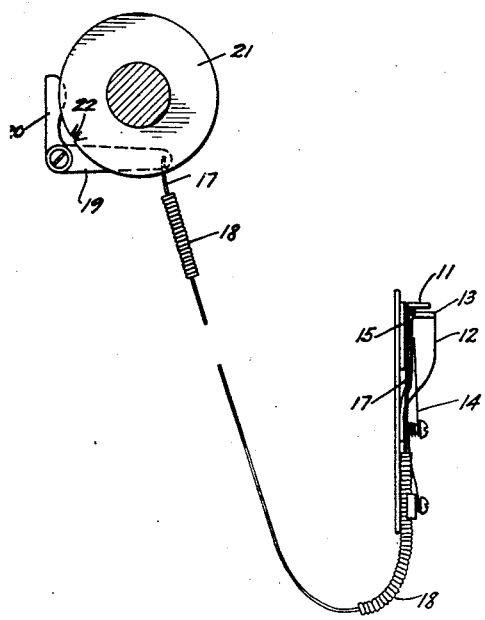
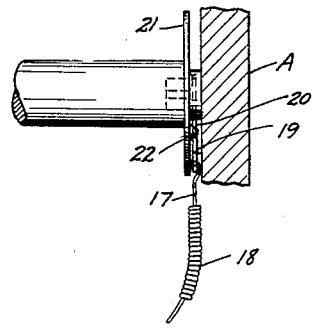
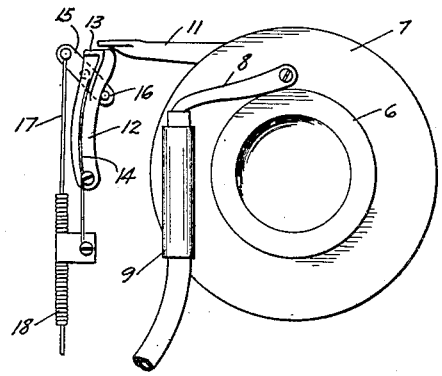
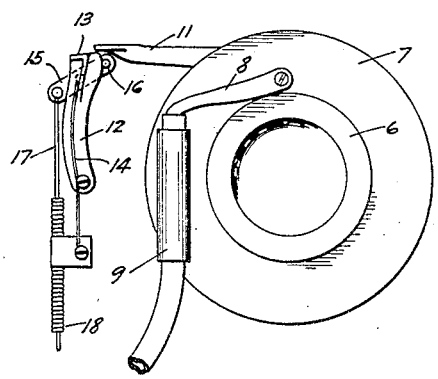
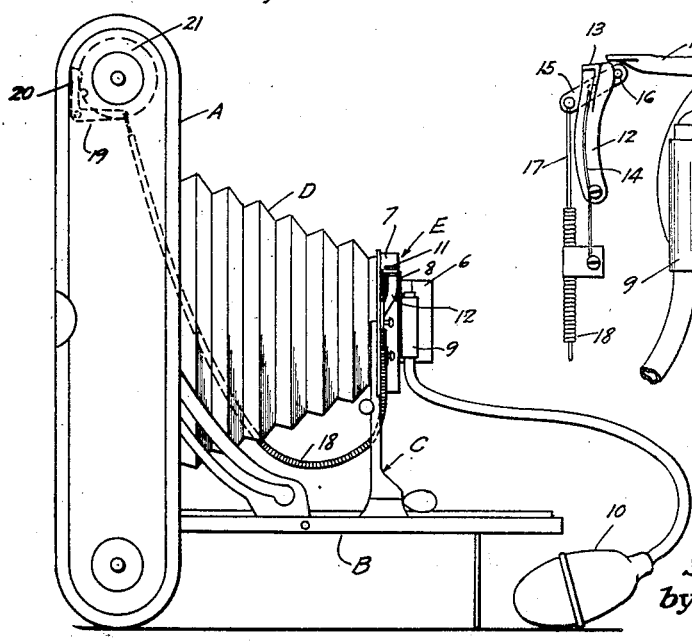
Inventor
Stanley Graham
by Nestall and Wallace
his Attorneys

UNITED STATES PATENT OFFICE.

STANLEY GRAHAM, OF LOS ANGELES, CALIFORNIA.

CAMERA-SHUTTER EXPOSURE-LOCK.

1,355,328.  Specification of Letters Patent.  Patented Oct. 12, 1920.

Application filed October 21, 1919. Serial No. 332,268.

*To all whom it may concern:*

Be it known that I, STANLEY GRAHAM, a citizen of the United States, residing at Los Angeles, in the county of Los Angeles and State of California, have invented new and useful Improvements in Camera-Shutter Exposure-Locks, of which the following is a specification.

This invention relates to means for locking the shutter of a camera after an exposure and to release the same upon another film surface being presented for exposure.

My invention is especially designed to prevent double exposures, and to that end a lock for the shutter is provided in combination with means actuated by the sensitive film body during the movement of the same to or from exposure position.

These objects will be more fully understood, as will also other objects and corresponding accomplishments of my invention from the following detailed description of a preferred embodiment thereof. For the purpose of this description, reference is had to the accompanying drawing in which:

Figure 1 is a side elevation of the device detached from the camera; Fig. 2 is a front elevation of the actuating elements, a wall of the camera being shown in section and a fragment of the reel is shown; Fig. 3 is an enlarged front elevation of the shutter in locked position; Fig. 4 is a view similar to Fig. 3 with the shutter in unlocked position; and Fig. 5 is a side elevation of a camera equipped with the shutter lock.

Referring more particularly to Fig. 5, the case of a collapsible camera is indicated by A. B is the drop front, upon which is mounted the sliding front C. Connecting the sliding front and the case is a bellows D. E indicates generally the lens and shutter mechanism.

Referring particularly to Figs. 3, 4, and 5, the lens tube is indicated by 6, and is mounted upon the shutter case 7. A lever for operating the shutter is indicated by 8. A pneumatic cylinder and plunger 9 controlled by a bulb 10 actuates the lever 8. A trigger 11 is provided for manual tripping of the shutter. This construction is well known. Upon raising the lever 8, trigger 11 is depressed. If trigger 11 is held against downward movement, the shutter cannot be tripped.

Pivotally mounted upon the sliding front is a keeper 12 having a forwardly extending shelf 13 so disposed that it may be moved under the end of the trigger, as shown in Fig. 3, to lock the latter against movement. A leaf spring 14 tends to hold the keeper in locked position. Pivotally mounted upon the sliding front is a release lever 15 having a pin 16 engaging the side of keeper 12. The side of keeper 12 in engagement with pin 16 is inclined, so that upon rocking the lever 15 from the position shown in Fig. 3 to that shown in Fig. 4, the keeper will be moved from under the trigger 11 to unlocked position. At the same time, pin 16 is disposed immediately beneath trigger 11, so that upon downward movement of trigger 11, the latter will engage pin 16 and move the release lever to the position shown in Fig. 3 restoring the same.

In order to operate the release lever, a wire 17 is secured to the other end thereof, and is extended through to a flexible casing 18 forming therewith a bowden wire, to the end of a trip lever 19, mounted within the magazine for the film take-up reel.

Lever 19 is of bell crank form, as is particularly shown in Fig. 1. The free arm 20 thereof is disposed adjacent the head 21 of the film spool. This head is preferably of metal and formed with a spur 22 adapted to engage the bell crank lever in its revolution, and move the wire 17 to rock lever 15 into the position shown in Fig. 4. After the spur has rocked lever 19, the latter is free to return.

Assume that the shutter is unlocked, as shown in Fig. 4. The bulb is pressed to open the shutter, trigger 11 moving downwardly and rocking release lever 15 to the position shown in Fig. 3. Upon return of trigger 11 to its upper position, keeper 12 moves under the trigger locking the latter. It is now impossible to open the shutter without moving keeper 12 from its position. Thus, the film, already exposed cannot be again exposed. Upon turning the take-up reel, spur 22 engages arm 20 of the bell crank lever, moving release lever 15 into the position shown in Fig. 4, and the camera is ready for another exposure. The film is of such length for an exposure that more than one or more revolutions of the spool are required to present unexposed film.

Lever 19 remains in its tripped position until restored by movement of the release lever.

What I claim is:

1. In a camera, the combination of a shutter provided with a trigger to trip the same, a keeper to lock said trigger, a release lever having an extension slidingly engaged with said keeper to move the latter from locking position, said extension being disposed so as to be moved by said trigger out of unlocking position upon the tripping of said trigger, a magazine for films having means operated by movement of said film to move said lever to unlocking position.

2. In a camera, the combination of a shutter provided with a trigger to trip the same, a pivoted keeper to lock said trigger, resilient means tending to hold said keeper in locked position, a release lever having an extension slidingly engaged with said keeper to move the latter from locked position, said extension being disposed so as to be moved by said trigger out of unlocking position upon tripping of said trigger, a magazine for film having means operating by movement of said film to move said release lever to unlocking position.

3. In a camera, the combination of a shutter provided with a trigger to trip the same, a keeper to lock said trigger having an inclined plane, a release lever having an extension slidingly engaging said plane so that upon rocking said lever the extension will move to rock said keeper out of locking position, said extension being so disposed that upon operation of said trigger said keeper will be released to permit the same to be moved into locking position, a magazine for film having means operated by movement of said film to move said release lever to unlocking position.

4. In a camera, the combination of a shutter provided with a trigger to trip the same, a keeper to lock said trigger having an inclined plane, a release lever having an extension slidingly engaged with said plane so that upon rocking said lever the extension will move to rock said keeper out of locking position, said extension being so disposed that upon operation of said trigger said keeper will be released to permit the same to be moved into locking position, a magazine for film having a trip lever operated by movement of the film, and flexible means connecting said trip lever and said release lever to communicate motion from one to the other.

5. In a camera, the combination of a shutter provided with a trigger to trip the same, a pivoted keeper to lock said trigger having an inclined plane thereon, resilient means tending to hold said keeper in locked position, a release lever having an extension slidingly engaged with said plane so that upon rocking said release lever the extension will move to rock said keeper out of locking position, said extension being so disposed that upon operation of said trigger said keeper will be released to permit the same to move into locked position, a magazine for film having a trip lever operated by movement of the film, and flexible means connecting said trip lever and said release lever to communicate motion from one to the other.

In witness that I claim the foregoing I have hereunto subscribed my name this 15th day of October, 1919.

STANLEY GRAHAM.